(12) United States Patent
Kaemmerer et al.

(10) Patent No.: US 10,502,309 B2
(45) Date of Patent: Dec. 10, 2019

(54) CYLINDRICAL-GEAR GEARING

(71) Applicant: VOITH PATENT GMBH, Heidenheim (DE)

(72) Inventors: Steffen Kaemmerer, Immenstadt (DE); Ralph Rudolph, Rettenberg (DE); Matthias Rauch, Kempten (DE); Marco Schneider, Oberstaufen (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 15/772,329

(22) PCT Filed: Oct. 27, 2016

(86) PCT No.: PCT/EP2016/075885
§ 371 (c)(1),
(2) Date: Apr. 30, 2018

(87) PCT Pub. No.: WO2017/072211
PCT Pub. Date: May 4, 2017

(65) Prior Publication Data
US 2018/0313443 A1    Nov. 1, 2018

(30) Foreign Application Priority Data
Oct. 30, 2015    (DE) .......................... 10 2015 221 299

(51) Int. Cl.
*F16H 57/04*    (2010.01)
*F16H 57/021*    (2012.01)
(Continued)

(52) U.S. Cl.
CPC ....... *F16H 57/0409* (2013.01); *F16H 57/021* (2013.01); *F16H 57/023* (2013.01);
(Continued)

(58) Field of Classification Search
CPC ............... F16H 57/0421; F16H 57/043; F16H 57/0456; F16H 57/0483; F16H 57/0409;
(Continued)

(56) References Cited

U.S. PATENT DOCUMENTS

| 1,220,810 A | 3/1917 | Alquist |
| 2,214,485 A | 9/1940 | Short |

(Continued)

FOREIGN PATENT DOCUMENTS

| DE | 3331131 A1 | 3/1985 |
| DE | 29517964 U1 | 2/1996 |

(Continued)

*Primary Examiner* — David H Bollinger
(74) *Attorney, Agent, or Firm* — Laurence A. Greenberg; Werner H. Stemer; Ralph E. Locher

(57) ABSTRACT

A spur gear transmission has at least two toothed spur gears, the toothings of which are in meshing engagement with one another and which are each rotatable about an axis of rotation. An enveloping wall encloses the two spur gears in a circumferential direction and in the direction of the axes of rotation. The enveloping wall has an inner contour which is adapted to the outer diameters of the spur gears such that ring-shaped gaps that merge into one another are formed between the enveloping wall and the spur gears. Each ring-shaped gap is arranged at least substantially concentrically with respect to a respective axis of rotation. The enveloping wall is formed by a multi-part housing which is closed along a parting joint. The parting joint extends partially or entirely substantially within a plane in which one of the two axes of rotation or both axes of rotation run.

32 Claims, 9 Drawing Sheets

(51) Int. Cl.
*F16H 57/023* (2012.01)
*F16H 57/032* (2012.01)
*F16H 57/02* (2012.01)

(52) U.S. Cl.
CPC ....... *F16H 57/032* (2013.01); *F16H 57/0423* (2013.01); *F16H 57/0427* (2013.01); *F16H 57/0435* (2013.01); *F16H 57/0436* (2013.01); *F16H 57/0495* (2013.01); *F16H 2057/02039* (2013.01)

(58) Field of Classification Search
CPC .... F16H 57/021; F16H 57/023; F16H 57/032; F16H 57/0423; F16H 57/0427; F16H 57/0435; F16H 57/0436; F16H 57/0495; F16H 2057/02039
See application file for complete search history.

(56) References Cited

U.S. PATENT DOCUMENTS

| | | |
|---|---|---|
| 2,645,305 A | 7/1953 | Roos |
| 5,950,501 A | 9/1999 | Deeg et al. |
| 6,374,949 B2 | 4/2002 | Schwertberger |
| 8,739,930 B2 | 6/2014 | Boenning et al. |
| 8,991,557 B2 | 3/2015 | Arisawa et al. |
| 2013/0025405 A1* | 1/2013 | Arisawa ................. F01D 25/18 74/606 R |
| 2013/0233107 A1 | 9/2013 | Von Wilmowsky et al. |
| 2014/0054114 A1 | 2/2014 | Isomura et al. |
| 2017/0184193 A1 | 6/2017 | Kaemmerer et al. |

FOREIGN PATENT DOCUMENTS

| | | |
|---|---|---|
| DE | 19860353 C1 | 6/2000 |
| DE | 102006022964 A1 | 11/2007 |
| DE | 102007041318 A1 | 3/2009 |
| DE | 102013223140 A1 | 5/2015 |
| DE | 102015209403 A1 | 11/2015 |
| EP | 2535618 A1 | 12/2012 |
| GB | 292540 A | 9/1928 |
| GB | 458379 A | 12/1936 |
| GB | 1426352 A | 2/1976 |
| JP | 2011163365 A | 8/2011 |
| WO | 2011099105 A1 | 8/2011 |
| WO | 2012028231 A1 | 3/2012 |
| WO | 2015177332 A1 | 11/2015 |

* cited by examiner

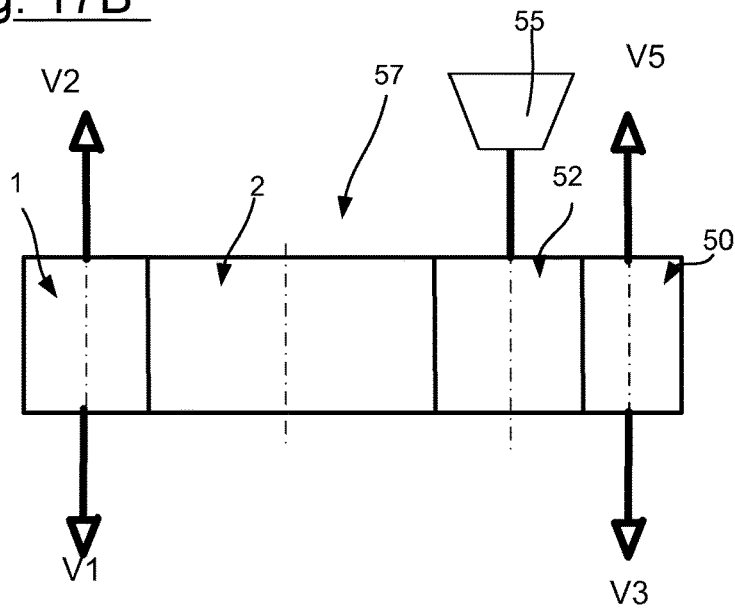
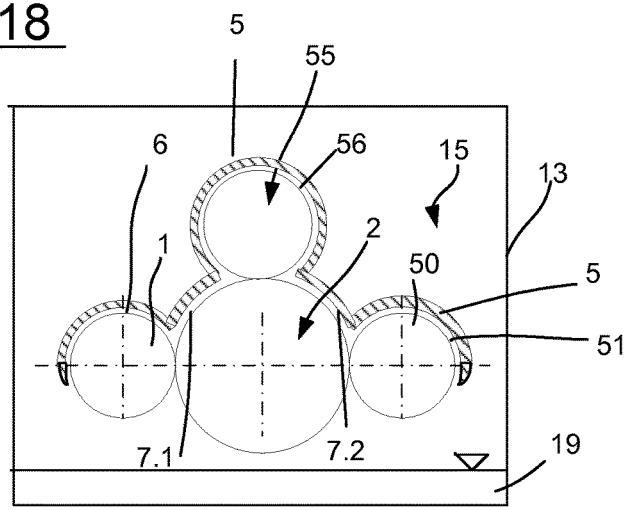
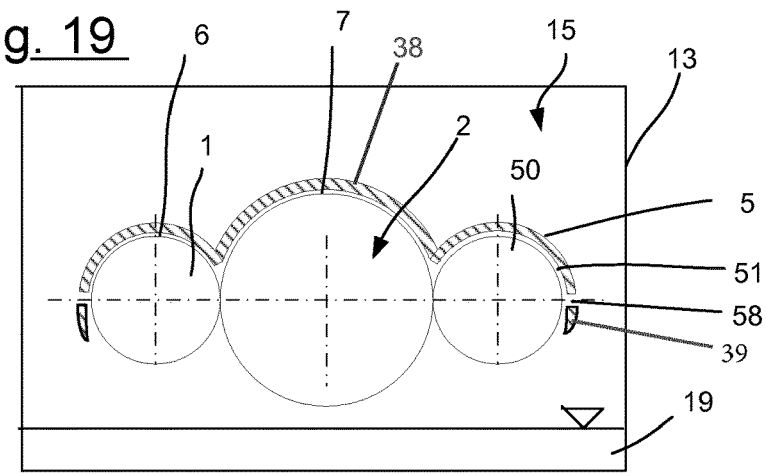

CYLINDRICAL-GEAR GEARING

BACKGROUND OF THE INVENTION

Field of the Invention

The present invention relates to a spur gear transmission having at least two toothed spur gears, the toothings of which are in meshing engagement with one another and which are each rotatable about an axis of rotation, and having an enveloping wall which encloses the two spur gears in a circumferential direction and in the direction of the axes of rotation. The enveloping wall has an inner contour which is adapted to the outer diameters of the spur gears such that, between the enveloping wall and the spur gears, there are formed two ring-shaped gaps which merge into one another, wherein in each case one ring-shaped gap is arranged at least substantially concentrically with respect to a respective axis of rotation.

Spur gear transmissions of the generic type are known for example from WO 2012/028231 A1. Spur gear transmissions of said type are designed for example as high-speed transmissions, such as turbo transmissions.

In particular in the case of such high-speed transmissions such as turbo transmissions, undesirable losses arise owing to the swirling of the air-oil mixture in the interior space of the transmission housing. Various measures are known for reducing the losses. One measure provides applying a vacuum in the interior space of the transmission housing by means of a vacuum pump, such that the pressure in the interior space is lower than that of the surroundings outside the transmission housing.

Another measure, which is intended to avoid such application of a vacuum in the transmission housing, is presented in WO 2012/028231 A1 as cited in the introduction, specifically the provision of an enveloping wall situated in a closely fitting manner around the spur gears, which enveloping wall encloses the spur gears in a circumferential direction with the exception of an inlet gap and possibly an outlet gap, which is positioned outside the outer circumference of the spur gears. This encapsulation of the spur gears with the enveloping wall was also provided for generating a negative pressure in the region of the outer diameter of the spur gears or in the region of the toothings thereof, which negative pressure reduces the losses.

Both known measures are therefore based on the assumption that as low a pressure as possible, that is to say as intense a vacuum as possible, must be generated in the region of the rotating toothings of the spur gears in order to reduce the power losses. Therefore, correspondingly complex measures for extensive sealing, or relatively high-powered and therefore expensive and energy-intensive vacuum pumps, have been provided in order to optimize the vacuum to the greatest possible extent. These measures are associated with undesired costs.

DE 198 60 353 C1 discloses a spur gear transmission in which the spur gears are enclosed by an additional inner housing which is fastened within a main housing. A partial vacuum is generated in the interior space of the inner housing by means of a pump. The space between the inner housing and the main housing is at atmospheric pressure. The spur gears do not project outward from the inner housing, but are rather enclosed by the latter with a spacing, such that there are also no resulting ring-shaped gaps that transition into one another.

DE 10 2006 022 964 A1 describes a fluid equalization container and a transmission equipped therewith. The fluid equalization container encloses the spur gears laterally over a part of their circumference.

DE 10 2007 041 318 A1 describes a transmission having a toothed-gear pump, wherein the toothed-gear pump is an external toothed-gear pump and has two intermeshing toothed gears, one of which belongs to one of the gear sets in the transmission. To form a pump gap, an additional housing is provided below the toothed gears, which additional housing extends partially over the circumference of the toothed gears.

GB 292 540 A describes toothed gears which rotate at high rotational speed in a housing and which are assigned a special guide for improving the lubrication of the toothed gears. The guide partially encloses the toothed gears and is closed at the underside at least such that the toothed gears do not project out of the guide.

GB 1 426 352 A describes a lubricating device for toothed gears, in the case of which a partially open inner housing is likewise provided which encloses the toothed gears at their underside and at one lateral side in a closely fitting manner.

GB 458 379 A discloses an air pump which is integrated into a transmission. The air pump has arcuate guide structures which enclose the toothed gears at their face sides.

US 2014/0054114 A1 discloses a lubricating oil supply for a transmission, in the case of which a cover fully encloses the pinion of two spur gears and encloses the other toothed gear of the two spur gears over half of the circumference.

U.S. Pat. No. 5,950,501 A presents a spur gear transmission, the inner housing of which surrounds the spur gears with a certain spacing and is evacuated by means of a pump or filled with a gas. No ring-shaped gaps which transition into one another are provided, and the spur gears do not project out of the inner housing.

U.S. Pat. No. 2,645,305 A describes a lubricating device for spur gears of a transmission with a lateral shield for the spur gears, which shield projects only over a small part of the outer circumference of the spur gears.

EP 2 535 618 A1 discloses spur gears which are enclosed by housings but which do not project out of the housings.

WO 2012/028231 A1 discloses a toothed-gear transmission having an enveloping wall which encloses at least one of two interacting toothed gears and which partially or completely closes off the enclosed interior space with respect to the surroundings. The toothed gears do not project out of the enveloping wall.

JP 2011-163365 A discloses a toothed-gear transmission having an oil duct which partially follows the shape of the toothed gears.

DE 33 31 131 A1 discloses a double-walled housing of an axle transmission, such that the housing can be connected to a coolant circuit and a cooling jacket can be realized in the housing.

For a hybrid transmission, it is already known from DE 10 2006 044 498 A1 for pipes to be led over the outer circumference of a stator and for the stator to be cooled by being sprinkled from said pipes.

In the case of a design from U.S. Pat. No. 2,214,485, an oil-air mixture is generated in a transmission housing, which mixture is used for lubrication purposes.

The prior art thus describes spur gear transmissions, the spur gears of which are enclosed in closely fitting fashion by an enveloping wall, and also toothed-gear pumps with toothed gears that are correspondingly enclosed in closely fitting fashion. In the case of toothed-gear pumps, however, the purpose of the envelopment is completely different to that in the case of spur gear transmissions. Accordingly, in the tooth engagement region of the toothed gears, a corresponding pressure chamber must be provided in order to deliver the pumped medium at the desired pump pressure. To achieve the desired delivery action, it is necessary for the pressure chamber to be delimited in a closely fitting and sealed manner. In the case of such toothed-gear pumps, which rotate much more slowly than spur-gear transmissions of the generic type, wetting of the toothed gears with the pumped medium does not play a role with regard to the efficiency. Rather, the toothed gears dip into the pumped medium, generally an oil sump, in order to be able to deliver said medium as desired. By contrast, in the case of generic spur gear transmissions, as discussed, the wetting of the spur gears with liquid medium, in particular oil, plays an important role. On the one hand, lubrication of the tooth engagement region is necessary in order to prevent premature wear. On the other hand, with increasing introduction of liquid, in particular oil, the power losses increase owing to the high rotational speed of the spur gear transmission. The demands on spur gear transmissions of the generic type therefore differ fundamentally from the demands on toothed-gear pumps.

SUMMARY OF THE INVENTION

The present invention is based on the object of specifying a spur gear transmission having at least two toothed spur gears of the type presented in the introduction, which spur gear transmission is firstly optimized with regard to power losses, operates reliably and with little wear, and can secondly be produced inexpensively.

The object according to the invention is achieved by means of a spur gear transmission as claimed. The dependent claims specify advantageous and particularly expedient embodiments of the invention.

A spur gear transmission according to the invention has at least two toothed spur gears, the toothings of which are in meshing engagement with one another, wherein the two spur gears are each rotatable about an axis of rotation. The spur gear transmission has an enveloping wall which encloses the spur gears, in particular the two spur gears or the at least two spur gears in engagement with one another, in a circumferential direction and in the direction of the axes of rotation, wherein the enveloping wall has an inner contour which is adapted to the outer diameters of the spur gears such that, between the enveloping wall and the spur gears, there are formed two ring-shaped gaps which transition into one another, wherein in each case one ring-shaped gap is arranged at least substantially concentrically with respect to in each case one axis of rotation.

According to the invention, the enveloping wall is formed by a multi-part housing which is closed along a parting joint, wherein the parting joint extends partially or entirely substantially within a plane in which the two axes of rotation of the spur gears run or in which one of the two axes of rotation runs.

The housing thus has multiple parts, specifically a first part, referred to in the present case as upper part, and a second part, referred to in the present case as lower part, which are joined together at the parting joint. The extent of the parting joint substantially in a plane in which the two axes of rotation of the spur gears run means in this case that the parting joint is situated with one section or even entirely in the plane within which the two axes of rotation run, or is, with the corresponding section or entirely, at least close to said plane, that is to say does not exceed a predefined spacing. For example, the spacing is smaller than an outer diameter of a driving shaft and/or of a driven shaft of the two spur gears. In another advantageous embodiment, the spacing is no greater than the radius of the driving shaft and/or of the driven shaft. This correspondingly also applies to the embodiment with the parting joint in the plane of only one axis of rotation of the spur gears.

The upper part and the lower part, each of which may be of unipartite or multi-part form, are advantageously detachably attached to one another along the parting joint. In one embodiment, multiple individual housing parts of the lower part are detachably attached to the upper part, wherein the individual housing parts jointly form the lower part.

In an alternative embodiment, the enveloping wall is formed by a multi-part housing which comprises at least two housing parts which are arranged spaced apart from one another, so as to form a gap, along a theoretical parting joint and which are mounted in each case separately in/on a transmission housing that accommodates the spur gear transmission, so as to form the enveloping wall. In this case, the housing preferably comprises at least one upper part and one lower part which are arranged spaced apart from one another in the region of the theoretical parting joint so as to form a gap and so as to be free from a connection to one another, wherein the theoretical parting joint extends partially or entirely substantially within a plane in which one of the two axes of rotation runs or both axes of rotation run.

The solution according to the invention offers the advantage of an easily realizable and also retrofittable possibility of a partial encapsulation, which reduces the power losses.

The upper part is advantageously of unipartite form.

The upper part particularly advantageously encloses at least one half of the common outer circumference of the two spur gears in unipartite fashion. The common outer circumference of the two spur gears is the sum of the individual circumferences of the two spur gears minus the sections that are situated directly opposite one another. In other words, the half of the common outer circumference is, in a cross section through and perpendicular to the two axes of rotation, formed by the part which is delimited on one side by a plane in which the two axes of rotation run.

It is particularly advantageous for side covers to be attached to the upper part and to the lower part, which side covers partially or fully cover the face sides of the spur gears, generally with the exception of the cross section of the driving shaft and/or driven shaft. The driving shaft and/or the driven shaft extend(s) for example through the side covers. In an alternative preferred embodiment of the invention, the spur gear transmission or the enveloping wall also makes do without corresponding side covers.

In a particularly advantageous embodiment of the invention, the enveloping wall is mounted elastically in a vertical direction and/or in a horizontal direction.

For example, the spur gear transmission has a transmission housing which comprises an interior space which is in particular filled with an air-lubricant mixture, and the spur gears are positioned together with the enveloping wall in the interior space.

The enveloping wall may advantageously be mounted in the transmission housing by means of individual locally delimited bearing points. Said bearing points are formed for example by projections or lugs on the outside of the enveloping wall. In a particularly advantageous embodiment of the invention, at least one upper bearing point is provided in the region of an upper end of the enveloping wall, and furthermore, at least two lower bearing points are provided in the region of the parting joint or below the parting joint of the enveloping wall. In a further embodiment of the invention, further bearing points, in particular four bearing points, are provided in the region of the parting joint of the enveloping wall.

The upper bearing point may serve for the mounting, in particular elastic mounting, in the vertical direction. The bearing points in the region of the parting joint may serve in particular for the mounting, advantageously for the elastic mounting, in the vertical direction. The lower bearing points may serve for the mounting, in particular elastic mounting, in the horizontal direction and/or vertical direction.

In one embodiment of the invention, each bearing point of the enveloping wall is elastically supported in the transmission housing. In an alternative embodiment, one or more bearing points are designed as fixed points without elastic support in the transmission housing, whereas other bearing points are elastically supported for the purposes of compensating thermal expansions, for example. In a further embodiment, each bearing point within a common plane or at least substantially within a common plane is fixed non-elastically in at least one first direction or within a first plane, and mounted elastically within a second direction, in particular second plane, which is for example perpendicular to the first direction or first plane, in the transmission housing. In an advantageous refinement, it is then the case that at least one further bearing point outside said common plane is fixed non-elastically in the second direction or second plane in the transmission housing, and mounted elastically parallel to the first direction or plane-parallel with respect to the first plane.

For example, the upper bearing point is supported elastically in a vertical direction and non-elastically in a horizontal direction in the transmission housing, and the lower bearing points are supported elastically in the horizontal direction and in particular non-elastically in the vertical direction in the transmission housing.

The elastic support of the bearing points permits the compensation of thermal expansion of the enveloping wall or of different thermal expansions between the enveloping wall and the transmission housing, and makes it possible for the gap between the spur gears and the enveloping wall to be designed to be minimal without the risk of contact.

If each spur gear has at least one driving shaft or driven shaft, said shafts are advantageously mounted in the transmission housing, in particular so as to be free from a mounting in the enveloping wall.

For example, the driving shaft and/or the driven shaft is mounted in each case in at least one rotary bearing, and shield plates, in particular shield panels, are provided between the rotary bearings and the side covers that are attached to the upper part and lower part of the enveloping wall, which shield plates or shield panels are positioned with a spacing to the side covers and/or with a spacing to the face sides of the spur gears. Such shield plates or shield panels prevent oil from the bearings from passing onto the gear disk or onto the toothing of the spur gears and thereby generating power losses.

In one embodiment of the invention, the enveloping wall is produced from rolled and bent sheet metal. It is particularly advantageous here for the inner contour of the enveloping wall to be produced solely by rolling and bending of the metal sheet, without subsequent mechanical reworking. Such a rolled surface exhibits a relatively low roughness, which reduces the power losses of the spur gear transmission, and the production from bent sheet metal eliminates the need for welding work and reworking operations following this. The sheet metal from which the enveloping wall is advantageously produced has for example a thickness of between 20 and 40 mm, in particular of 25 to 35 mm, for example of 30 mm.

It is particularly expedient if the enveloping wall exhibits higher thermal conductivity than the transmission housing, in order for heat that is generated within the enveloping wall to be dissipated as rapidly as possible.

For example, the enveloping wall is produced from aluminum or an aluminum alloy, and the transmission housing is produced from steel or a steel alloy. Use may self-evidently also be made of other materials.

The upper part may advantageously have a permanently open or closable maintenance opening which permits direct access to the tooth engagement region of the two spur gears. The maintenance opening is accessed for example via a so-called inspection hole cover of the transmission housing.

The transmission housing is advantageously of two-part or multi-part form, and has in particular a parting joint in the same plane as the parting joint of the enveloping wall.

The transmission housing particularly advantageously has a lower housing half and an upper housing half, which may each be of unipartite or multi-part form.

In one embodiment, the shield plates may each be of unipartite form. Another embodiment provides that each shield plate is of at least two-part form, for example with an upper half and a lower half, which each enclose half of the circumference of the driving shaft and/or of the driven shaft. The shield plates may then likewise have a parting joint, which advantageously runs in the same plane as the parting joint of the enveloping wall and/or of the transmission housing.

A particularly advantageous assembly method for the assembly of a spur gear transmission has the following steps:

1. Firstly, the lower halves of the shield plates are installed in the lower housing half of the transmission housing and, at the same time, or immediately thereafter or at a later point in time, the upper halves of the shield plates are installed in the upper housing half of the transmission housing.
2. At least after the installation of the lower halves of the shield plates into the lower housing half of the transmission housing, the lower part of the housing of the enveloping wall is installed in the lower housing half of the transmission housing.
3. The spur gears can subsequently be installed together with their bearings.
4. The upper part of the housing of the enveloping wall is subsequently installed such that the enveloping wall is fully assembled. It is now possible to inspect whether the enveloping wall is correctly aligned in the transmission housing and all connections have been correctly made.
5. Finally, the upper housing half of the transmission housing is mounted and installed, whereby the assembly process can be completed.

In one embodiment according to the invention, the enveloping wall encloses the two spur gears in a circumferential direction only over a part of the circumference thereof, such that a part of the outer circumference of the two spur gears or of at least one of the two spur gears projects outward from the enveloping wall. This part of the circumference which projects outward from the enveloping wall is thus exposed to the surroundings of the enveloping wall, for example to an interior space of a transmission housing of the spur gear transmission. Accordingly, complete encapsulation of the spur gears as in the cited prior art is not provided. If the two spur gears are positioned adjacent to one another, that part of the circumference which projects outward from the enveloping wall is situated outside a projection surface formed by a cross section, perpendicular to the axis of rotation of the spur gears, through those parts of the enveloping wall which are positioned along the outer circumference of the spur gears. In other words, not only does the enveloping wall have an opening over the circumference of the spur gears, through which opening the spur gears have, as it were, a line of sight to the surroundings of the enveloping wall, but also, the spur gears actually project out of a corresponding opening of the enveloping wall and protrude beyond said opening. If the two spur gears are positioned one above the other, the lower spur gear correspondingly projects downward beyond a horizontal plane in which the enveloping wall extending downwardly from the upper to the lower spur gear ends.

That part of both spur gears, or of the one spur gear, which projects out of the enveloping wall is positioned at the underside of the spur gears, that is to say, during the operation of the spur gear transmission, in the direction of an oil sump that accumulates at the bottom in the spur gear transmission under the action of gravitational force. By contrast, on their opposite, upper side, the spur gears are advantageously fully enclosed by the enveloping wall. If the spur gears are positioned one above the other, wherein in particular exactly two spur gears are provided, of which one is positioned above the other, it is for example possible for the lower spur gear to be enclosed, proceeding from at least substantially the level of its axis of rotation or below the latter, over an arc of at least approximately at least 90°, and the upper spur gear is then advantageously enclosed by the enveloping wall over more than 180°, in particular over substantially 270°, proceeding from adjacent to the engagement region of the two toothings and, over the further course, upward across the peak of the upper spur gear to the opposite side and down again at least substantially to the height of the axis of rotation of the upper spur gear.

That part of the spur gears which projects downward out of the enveloping wall, or in the case of the spur gears being positioned one above the other, that part of the lower spur gear which projects out downward, is advantageously positioned freely above an oil sump in the transmission, in particular with a spacing to the oil sump or to a lower wall of the transmission housing, wherein the spacing advantageously amounts to a multiple of the spacing between the enveloping wall and the enclosed region of the one or more spur gears.

The invention can however also be used, with the corresponding measure, in a transmission in which an oil sump is provided outside the transmission housing or a corresponding oil sump can be omitted by means of some other suitable lubrication arrangement.

The two spur gears are advantageously positioned with their axes of rotation adjacent to one another in a horizontal direction of the spur gear transmission, wherein the axes of rotation run in particular within a common horizontal plane. The plane is in particular parallel to the surface of an oil sump at the bottom in the spur gear transmission.

The enveloping wall advantageously fully encloses the two spur gears over their upper half and additionally over a part of the lower half, as viewed in a cross section through a vertical plane perpendicular to the axes of rotation of the spur gears. Those two parts of the envelopment which go beyond the upper half may in particular be designed to be tapered in their cross section at their free end.

In one embodiment of the invention, the gap or ring-shaped gap between the envelopment and the outer diameter of the spur gears is of tapered design at the free end of the envelopment. This may be provided at one free end or at both free ends of the envelopment. Such a reduction of the ring-shaped gap relative to the remaining region of the ring-shaped gap gives rise to a sealing action, which prevents or reduces undesired escape and/or ingress of oil into the ring-shaped gap.

In one embodiment of the invention, the region of the meshing engagement of the spur gears, in particular on the top side of the two spur gears, is free from an envelopment, or a corresponding window is provided in the envelopment.

It is advantageously possible for a negative pressure to be generated in the interior space of the transmission housing. This means that a lower pressure prevails in said interior space than in the surroundings of the transmission housing.

According to one embodiment of the invention, between the transmission housing and a part or the entire circumference of the enveloping wall, a spacing may be provided which is formed by the interior space.

In an advantageous embodiment of the invention with partially encapsulated spur gears, that part of the outer circumference of the two spur gears which projects out of the enveloping wall extends over an arc of in each case 10° to 170°, in particular of 90° to 130°, including or excluding the boundary values.

For example, that part of the spur gears which projects out of the enveloping wall is positioned at the underside of the spur gears in relation to the intended use of the spur gear transmission.

The ring-shaped gaps may for example have a thickness of 1 to 10 mm, at least in the part in which the inner contour of the enveloping wall and the outer diameter of the spur gears are equidistant or concentric with respect to one another.

In one embodiment of the invention, an opening is provided in at least one side cover or in both side covers in the region of the mutual engagement of the toothings of the two spur gears. Said opening may for example serve for the discharge of cooling oil from that region of the spur gears which is enclosed by the enveloping wall, or from the ring-shaped gaps.

The cooling oil, or generally the cooling medium, for the spur gears may for example be sprayed into the tooth entry point or preferably tooth exit point of the intermeshing toothings. Corresponding nozzles may be provided there for this purpose.

If the enveloping wall is downwardly open, it is also possible here for the cooling oil to be easily discharged from the enveloping wall.

In one embodiment of the invention, the enveloping wall is, at at least one circumferential end or at both circumferential ends in a circumferential direction of the spur gears, of wedge-shaped tapered design. The formation of a wedge at the circumferential ends has the effect that the flow of the air-lubricant mixture is conducted away from the toothings of the spur gears in a radial direction. A situation is thus prevented in which lubricant-rich medium is drawn into the ring-shaped gap. The wedges serve, so to speak, as a seal for sealing off the ring-shaped gap with respect to the surroundings or with respect to the interior space of the transmission housing. It should be noted here that the spur gears generally rotate toward one another in the region of their circumference covered by the enveloping wall and rotate away from one another in the region of the circumference not covered by the enveloping wall.

The enveloping wall may have a cooling arrangement. For example, cooling bores for conducting a cooling medium and/or surface-enlarging ribs on the outer side of the enveloping wall may be provided, and/or a cooling medium sprinkling apparatus is provided for sprinkling the enveloping wall from the outside.

The spur gear transmission according to the invention is advantageously designed as a rotational speed/torque conversion device. In particular, the spur gears are positioned so as not to dip into a liquid reservoir, in particular oil sump.

A spur gear transmission may be formed as a two-shaft or multi-shaft spur gear transmission. In the latter case, a multiplicity of spur gears that are rotatable about in each case one axis of rotation are provided. Each of the spur gears is in meshing engagement with at least one other of the spur gears. The enveloping wall is formed so as to run around at least a partial region of each of the spur gears, wherein the axes of rotation of individual or all spur gears are arranged in a common parting joint of the transmission housing. In this case, the enveloping wall preferably extends, in an installed position of the transmission, as viewed in an axial direction, from a first, axially outer spur gear, around the outer circumference of the spur gear configuration so as to form ring-shaped gaps between the inner circumference of the enveloping wall and the individual spur gears, to the second spur gear, which is the outer spur gear in the axial direction.

The enveloping wall may, depending on transmission configuration, be of single-part or multi-part form, wherein the individual enveloping wall parts are connected to one another preferably in non-positively locking, positively locking or cohesive fashion. In an alternative embodiment, it would also be conceivable for a small gap to be present between the individual enveloping wall parts, wherein the formation of the enveloping wall unit is realized, in the case of integration in the transmission, by connection or mounting of the individual enveloping wall parts to/in the transmission housing. That is to say, the enveloping wall is composed of a unipartite or multi-part upper and lower part, wherein these are arranged spaced apart from one another by a gap of small size, and are mounted in each case separately in/on the transmission housing so as to form the enveloping wall functional unit.

In the embodiments, the spur gears do not run in the oil sump, that is to say the transmission configuration does not involve any direct contact of the spur gears with the oil sump. Even in the case of a multi-shaft design, at least one of the spur gears projects at least partially out of the enveloping wall.

In one advantageous application, a spur gear transmission according to the invention integrates driving and/or driven assemblies to form a machine train by connection to the individual shafts connected to the spur gears, so as to form a geared turbomachine. Steam turbines, gas turbines, expanders and engines are possible individually or in combination as driving assemblies, and compressors, pumps and generators are possible individually or in combination as driven assemblies. The geared turbomachines are thus formed as a geared compressor or expander installation or a combination of both. Another use may be a steam or gas turbine as a driving assembly and a generator as a driven assembly. In general, a complete geared turbomachine is formed as a train, wherein, via the transmission, the driving and driven assemblies, in particular steam turbines, gas turbines, expanders and engines, generators and compressors, interact with one another in terms of process technology in a manner dependent on the design of the geared turbomachine.

The invention will be described by way of example below on the basis of an exemplary embodiment and the figures.

BRIEF DESCRIPTION OF THE SEVERAL VIEWS OF THE DRAWING

FIG. 17b shows the embodiment of the spur gear transmission as a multi-shaft transmission in a geared turbomachine;

FIG. 18 illustrates, by way of example, a further embodiment of a multi-shaft spur gear transmission with partial encapsulation;

FIG. 19 illustrates, by way of example on the basis of an embodiment as per FIG. 15, an embodiment of the enveloping wall with upper and lower parts which are arranged so as to form a gap relative to one another and which are mounted separately in the transmission housing.

DESCRIPTION OF THE INVENTION

Figure 1:
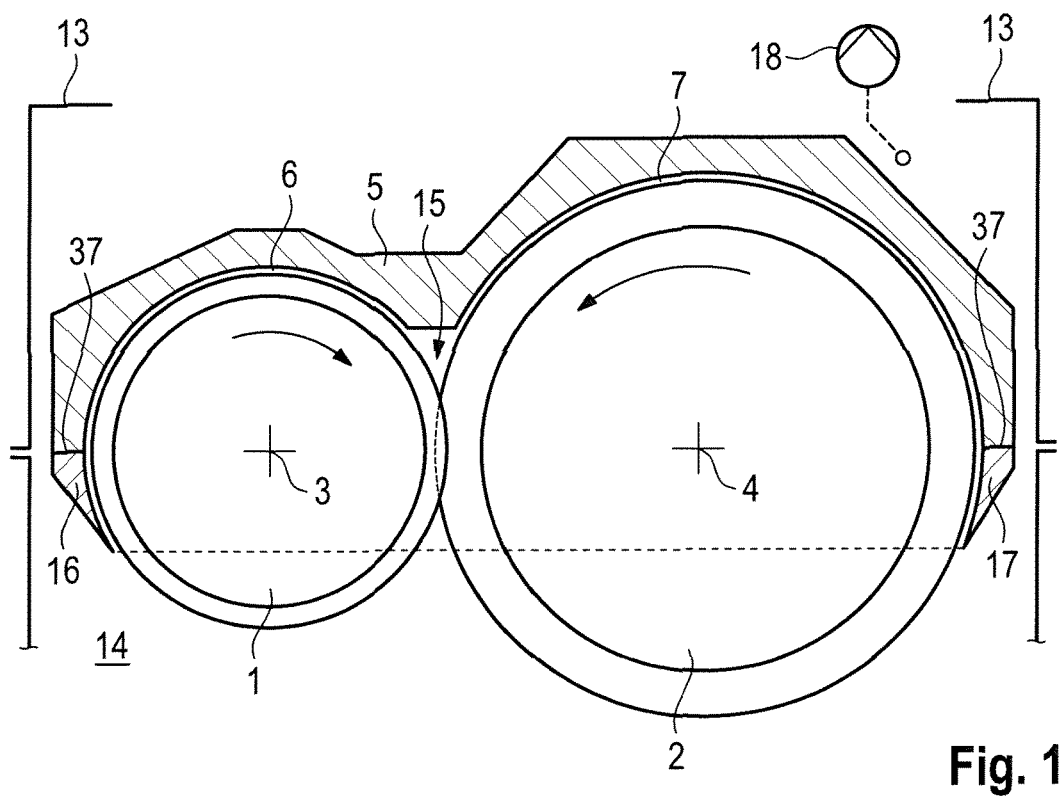
FIG. 1 shows a schematic axial section through a spur gear transmission designed according to the invention with partial encapsulation.

FIG. 1 illustrates a spur gear transmission having a first spur gear 1 and a second spur gear 2, which are designed for example as helically toothed or double helically toothed spur gears. As can be seen, the toothings of the two spur gears 1, 2 are in meshing engagement with one another, such that the first spur gear 1, if it rotates about its axis of rotation 3, drives the second spur gear 2 about its axis of rotation 4, or vice versa. The direction of rotation of the spur gears 1, 2 is indicated by the arrows.

An enveloping wall 5 is provided which encloses the spur gears 1, 2 in a closely fitting manner, wherein the enveloping wall 5 however extends only over a part of the circumference of the two spur gears 1, 2, such that a part of the outer circumference of the spur gears 1, 2 is exposed to an interior space 14 of the in this case only schematically illustrated transmission housing 13. In the exemplary embodiment shown, the part of the outer circumference of the two spur gears 1, 2 projects out of the enveloping wall 5 at the bottom side of the spur gears 1, 2.

In the remaining region of the circumferences of the two spur gears 1, 2, the inner contour of the enveloping wall 5 forms, together with the outer diameters of the spur gears 1, 2, two ring-shaped gaps 6, 7 which transition into one another, which ring-shaped gaps have a constant thickness over the circumference of the spur gears 1, 2 aside from in the region of the engagement region 15 of the toothings.

The enveloping wall 5 is formed by a housing which is composed of multiple, in this case three, parts which are joined together along the parting joint 37.

In the exemplary embodiment shown, that part of the outer circumference of the two spur gears 1, 2 which projects out of the enveloping wall 5 extends in each case over an arc of approximately 180°, wherein the difference in relation to 180° is covered by two wedges 16, 17 at the two circumferential ends of the enveloping wall 5, that is to say the enveloping wall 5 is of wedge-shaped tapered design at its two circumferential ends. As is conceivable on the basis of the illustrated directions of rotation of the spur gears 1, 2, said wedge-shaped tapering causes a diversion of the flow in a radial direction away from the spur gears 1, 2 in the region in which the spur gears 1, 2 enter the enveloping wall 5.

The projection surface out of which the two spur gears 1, 2 project is delimited by the dashed line and by the enveloping wall 5 that is shown in cross section. As can be seen, the enveloping wall 5 therefore not only simply has an opening at the bottom through which the spur gears 1, 2 are visible from the outside, but rather the spur gears 1, 2 project with their outer circumference out of the enveloping wall 5.

Within the interior space 14, a lubricant sump or oil sump may be provided in the transmission housing 13 at the bottom, which oil sump is not illustrated in any more detail here because it has a corresponding spacing to the underside of the spur gears 1, 2. Furthermore, a suction apparatus, that is to say a vacuum pump, may be provided which is connected with its suction side to the interior space 14 in order to apply a vacuum to the latter. A vacuum pump of said type is illustrated merely schematically, and is denoted by the reference designation 18.

The invention may however also be implemented without a vacuum pump of said type.

In the embodiment as per FIG. 1, it is in particular the case that no side covers attached to the enveloping wall 5 and covering the face sides of the spur gears 1, 2 are provided. Rather, the spur gears 1, 2 are enclosed by the enveloping wall 5 only on their outer circumference.

Figure 2:
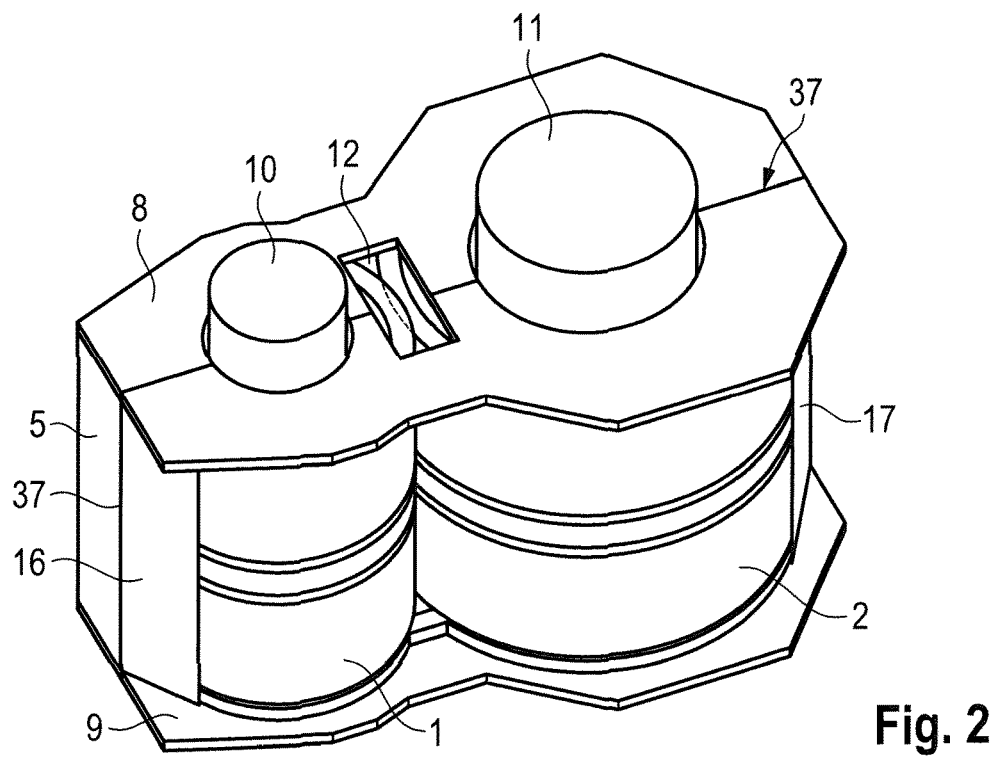
FIG. 2 shows an oblique plan view of the partially encapsulated spur gears from FIG. 1, but in this case equipped with additional optional side covers.

In the embodiment as per FIG. 2, the enveloping wall 5 from the embodiment as per FIG. 1 is combined with side covers 8, 9, wherein this is however not imperative.

FIG. 2 illustrates the two side covers 8, 9 which are attached laterally to the enveloping wall 5. As can be seen, said side covers also cover that part of the outer circumference of the spur gears 1, 2 which projects downward out of the enveloping wall 5.

The first spur gear 1 has a driving shaft 10 and the second spur gear 2 has a driven shaft 11. The two shafts 10, 11 are led through the side covers 8. In the case of a second spur gear 2 which drives the first spur gear 1, the shafts 10, 11 would be correspondingly interchanged.

Furthermore, an opening 12 is provided in the side cover 8, and in particular also in the side cover 9, in the region of the mutual engagement of the toothings of the two spur gears 1, 2. Said opening serves for the discharge of coolant.

It can also be seen from FIG. 2 that, in the exemplary embodiment shown, each spur gear 1, 2 has two toothings which, in an axial direction, are positioned adjacent to one another and in particular with a spacing to one another in order to form a double toothing, in particular a double helical toothing.

FIG. 3 illustrates, once again schematically, an embodiment of a spur gear transmission according to the invention as per a preferred embodiment. Here, the upper part 38 of the enveloping wall 5 encloses in each case the upper half of the two spur gears 1, 2 and thus ends in a horizontal plane running through the axes of rotation 4, 5, see the dashed line. The lower part of the enveloping wall 5, which advantageously encloses the spur gears 1, 2 only partially in their lower half, is not illustrated. However, in an alternative embodiment, the lower halves of the spur gears 1, 2 may also be fully enclosed by the lower part.

The oil sump 19 is schematically illustrated at the bottom in the transmission housing 13 that encloses the two spur gears 1, 2 and the enveloping wall 5. It can be seen that the spur gears 1, 2 have a spacing D to the transmission housing 13 and also a spacing d to the oil sump 19.

Figure 3:
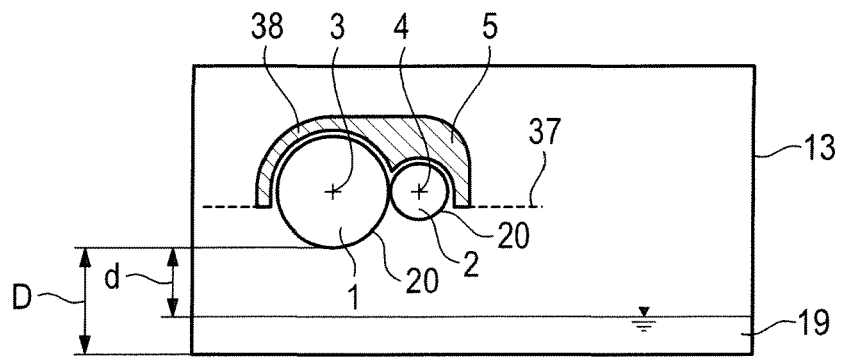
FIG. 3 shows a schematic illustration of a possible partial encapsulation of the spur gears with a transmission housing surrounding the latter.
Figure 4:
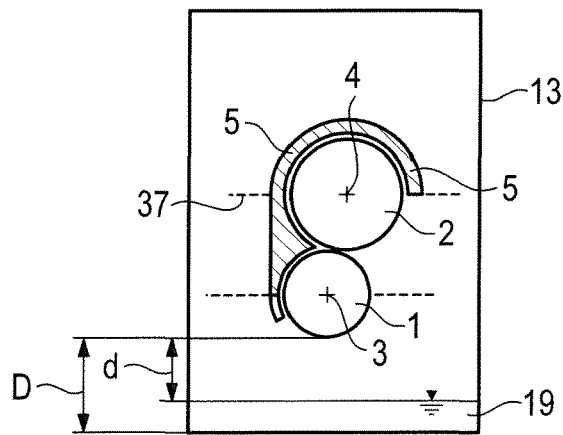
FIG. 4 shows an alternative embodiment in relation to FIG. 3, in which the spur gears are positioned one above the other.

FIG. 4 shows an alternative embodiment in a similar illustration to that in FIG. 3. By contrast, in this case, the spur gears 1, 2 are positioned one above the other. With regard to the illustrated components, reference is made to FIG. 3 and the corresponding reference designations. Here, the parting joint 37 runs in a plane of the upper axis of rotation 4. As indicated by the dashed lines, it would additionally or alternatively also be possible for a parting joint of the enveloping wall 5 to be provided in the plane of the lower axis of rotation 3.

In FIG. 4, the upper spur gear, in this case the second spur gear 2, is enclosed over three quarters of its circumference, that is to say approximately over 270°, by the enveloping wall 5, and the lower spur gear, in this case the first spur gear 1, is enclosed over one quarter of its circumference, that is to say over approximately 90°, by the enveloping wall 5. Accordingly, the lower half of the first spur gear 1 projects downward out of the enveloping wall 5, in this case too see again the dashed line that indicates the plane in which the enveloping wall 5 ends from above. If a lower parting joint is provided, the first spur gear 1 is enclosed to a greater extent. The spacings d, D of the lower spur gear 1 to the oil sump 19 and to the transmission housing 13 respectively also again amount, as in the embodiment as per FIG. 3, to a multiple of the spacing between the spur gears 1, 2 and the enveloping wall 5 in the region of the enclosure or encapsulation.

Figure 5:
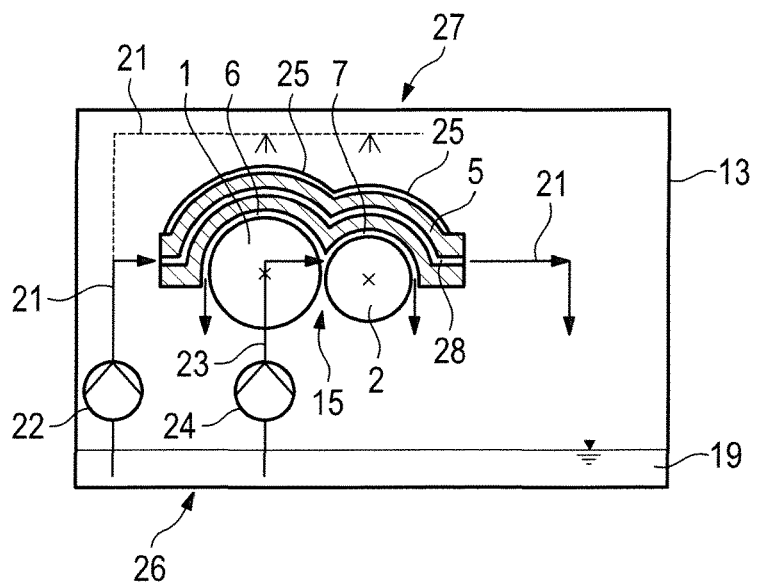
FIG. 5 shows a schematic illustration with the separation of the cooling and lubrication of the spur gears or of the toothings thereof.

FIG. 5 illustrates another aspect of the present invention, specifically the separation of the cooling of the spur gears 1, 2 from the lubrication of the spur gears 1, 2. Accordingly, a first oil volume flow for cooling the spur gears 1, 2 is conducted through the enveloping wall 5. Said first oil volume flow is denoted by 21. For the delivery of said first oil volume flow 21, a first oil pump 22 is schematically indicated, which delivers the oil out of the oil sump 19. This is however not imperatively necessary; it would also be possible for some other coolant or some other delivery means to be provided. It is alternatively or additionally possible, as indicated by the dashed line, for the enveloping wall 5 to also be cooled by being sprinkled with the first oil volume flow 21. In the present case, a cooling duct 28 is schematically illustrated which runs within the enveloping wall 5. As can be seen, the profile of the cooling duct 28 follows the profile of the inner contour of the enveloping wall 5, though this is not imperatively necessary. It would also be possible for a cooling duct 28 of said type to be omitted entirely, and for the coolant to be conducted only along the outer surface of the enveloping wall 5.

For the lubrication of the spur gears 1, 2, a second oil volume flow 23 is conducted into the toothings of the spur gears 1, 2, advantageously into the engagement region 15 of the toothings, for example through one or more openings 12 as illustrated in FIG. 2. Said second oil volume flow 23 is for example delivered out of the oil sump 19 by means of a second oil pump 24. It is however also possible here, too, for some other delivery means or some other source to be used.

The components or features relating to the lubrication of the spur gears 1, 2 form a lubricating device 26, whereas the components and features relating to the cooling of the enveloping wall 5, and thus indirectly of the spur gears 1, 2, form a cooling device 27.

The first oil volume flow 21 and the second oil volume flow 23 may also be delivered by means of a common oil pump, wherein in all cases, however, the first oil volume flow 21 is advantageously greater than, and in particular amounts to a multiple of, the second oil volume flow 23.

The second oil volume flow 23 can advantageously spray freely from the spur gears 1, 2, whereas the first oil volume flow 21 generally emerges from the enveloping wall 5 through at least one corresponding opening or, in the case of sprinkling of the enveloping wall 5, runs or drips off the enveloping wall 5.

By means of the active cooling of the enveloping wall 5, the spur gears 1, 2 can, by contrast to direct cooling, be cooled indirectly by heat transfer via the ring-shaped gaps 6, 7 into the enveloping wall 5. This makes it possible for a relatively small lubricating oil volume flow, in this case second oil volume flow 23, to be delivered through the ring-shaped gaps 6, 7 and/or the engagement region 15 of the toothing, which reduces the losses.

Cooling of the enveloping wall 5 by means of cooling ribs 25 on the outside of the enveloping wall 5 is also schematically shown in the exemplary embodiment shown.

FIG. 6 shows once again the positioning of the enveloping wall 5 within the transmission housing 13, of which only the lower housing half 46 is illustrated. Again, the corresponding reference designations for the various components are used, wherein a repeated description will be omitted. In this embodiment, it is in particular again the case that no side covers are provided, with the face sides of the spur gears 1, 2 rather at least partially freely or entirely freely facing the inner surface of the transmission housing 13. As will be discussed in more detail below, it is however the case in the exemplary embodiment shown that shield plates 41 are provided, which are positioned with a spacing to the spur gears 1, 2 and which are thus arranged between the transmission housing 13 and the spur gears 1, 2 or the face sides thereof.

Figure 6:
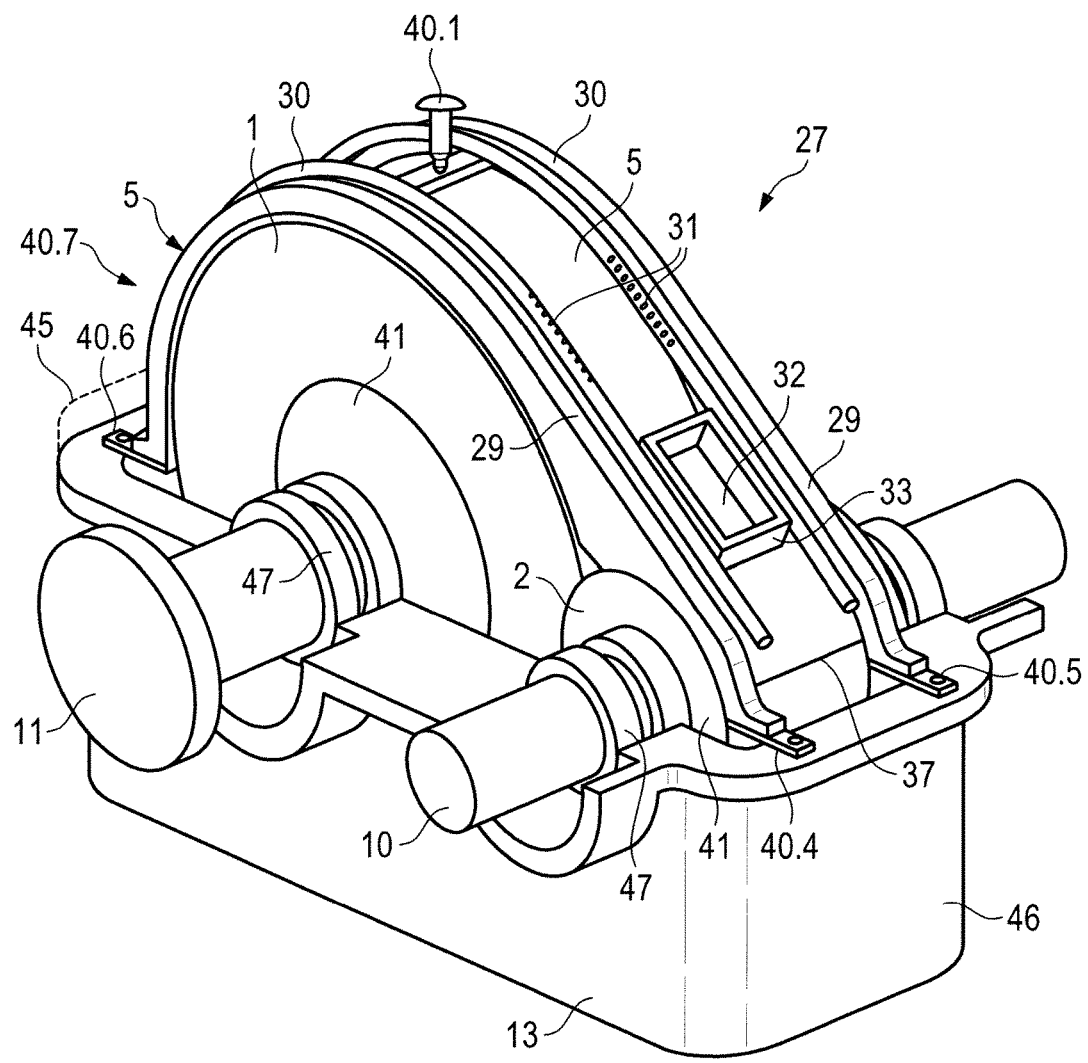
FIG. 6 shows an exemplary embodiment of a cooling device with sprinkling device and webs on the enveloping wall.

In the exemplary embodiment shown in FIG. 6, the cooling device comprises two coolant-conducting pipes 30 which run along the outer side of the enveloping wall 5 and which, in the exemplary embodiment shown, are situated opposite one another in parallel, though this is not imperatively necessary. The pipes 30 advantageously run on both sides approximately radially outside the face sides of the spur gears 1, 2. The pipes 30 have outlet openings 31 via which coolant can be sprayed or sprinkled onto the outer circumference of the enveloping wall 5. Owing to the arrangement of the pipes 30 and of the outlet opening 31, the outer circumference of the enveloping wall 5 is wetted uniformly, and the sprayed-on coolant runs off along the outer circumference on the outside of the enveloping wall 5, absorbing heat from the enveloping wall 5 in the process.

To prevent the coolant from flowing or dripping laterally off the enveloping wall 5 across the face sides of the spur gears 1, 2 onto rotating parts, in particular the shafts 10, 11, webs 29 are provided which prevent this. The webs 29 firstly impart stability to the enveloping wall 5, and secondly constitute a barrier for the coolant flowing on the outside of the enveloping wall 5. The height of the webs 29 is advantageously dimensioned such that said webs are at least as tall as the pipes 30, that is to say extend as far as the top side thereof.

In the region above the engagement region of the toothings, a maintenance opening 32 is provided in the enveloping wall 5, which maintenance opening is enclosed by side walls 33 such that no coolant that flows over the outer side of the enveloping wall 5 can enter the maintenance opening 32. Although not illustrated here, the maintenance opening 32 may be closable by means of a cover. This is however not imperatively necessary.

The maintenance opening 32 may be accessible via an inspection hole cover (not illustrated) of the upper housing half 45 (indicated here only by dashed lines) of the transmission housing 13.

In FIG. 6, it is also possible to see so-called shield plates 41, for example in the form of shield panels, which are positioned with a spacing to the face sides of the spur gears 1, 2, and which are in particular inserted or installed in the lower housing half 46 and in the upper housing half 45. Said shield plates 41 serve for preventing a passage of the bearing oil of the bearings 47, by means of which the shafts 10, 11 are mounted in the transmission housing 13, to the rotating parts of the spur gears.

The enveloping wall 5 has a parting joint 37 which, in the exemplary embodiment shown, is situated in the same horizontal plane as a parting joint of the transmission housing 13 and of the shield plates 41. In the region of said parting joint 37, the enveloping wall 5 is mounted in the transmission housing 13, in particular in the lower housing half 46, by means of four bearing points 40.4, 40.5, 40.6 and 40.7. The enveloping wall 5 is furthermore mounted in the transmission housing 13 by means of the upper bearing point 40.1 and two lower bearing points 40.2 and 40.3, in this regard see also FIGS. 7 and 8.

Figure 11:
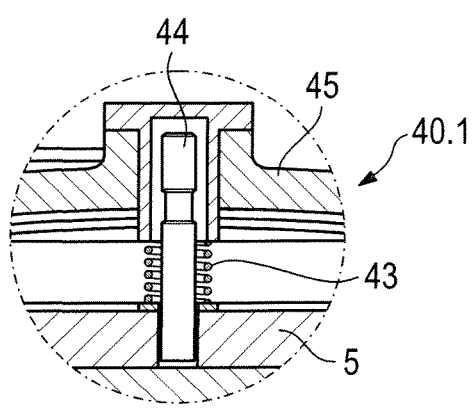
FIG. 11 shows an exemplary design of an upper bearing point.
Figure 12:
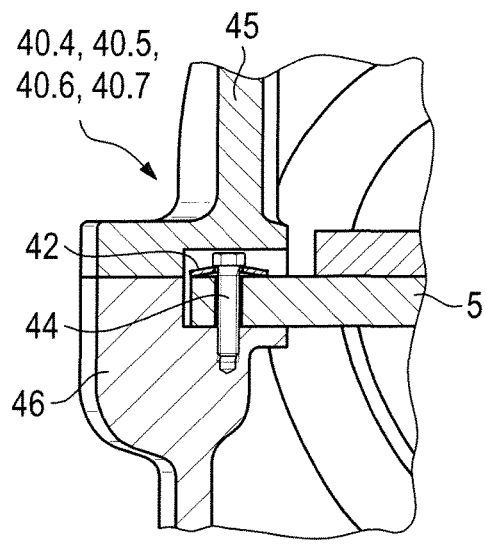
FIG. 12 shows an exemplary design of a bearing point in the region of the parting joint.
Figure 13:
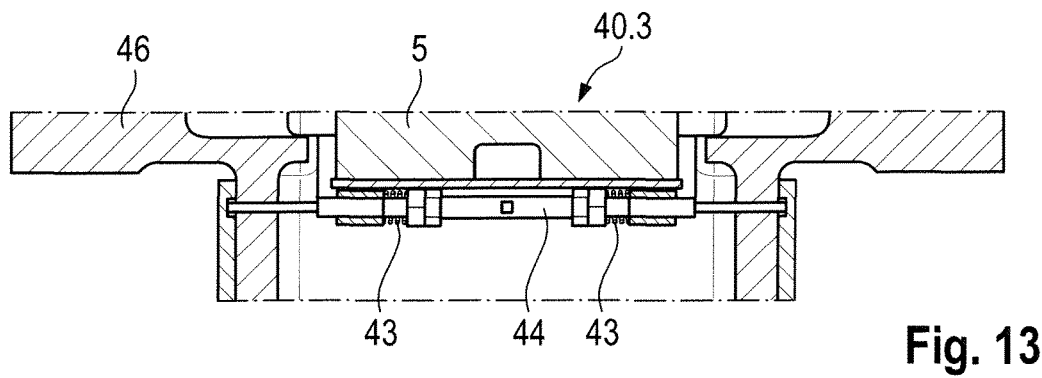
FIG. 13 shows an exemplary design of a lower bearing point.
Figure 14:
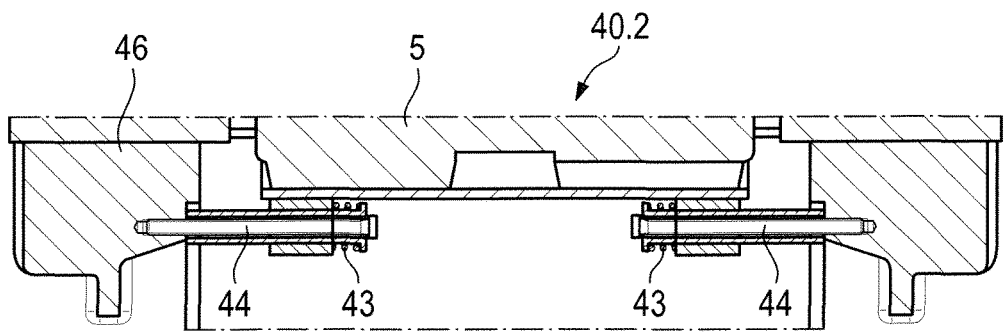
FIG. 14 shows an exemplary design of a lower bearing point.

To compensate thermal expansions, the bearing points 40.1-40.7 are advantageously of elastic design, for example through the provision of disk springs 42 and compression springs 43 on bearing journals 44, as illustrated by way of example in FIGS. 11-13 for the upper bearing point 40.1 in FIG. 11, the bearing points 40.4-40.7 in the region of the parting joint 37 in FIG. 12, and for the lower bearing points 40.2, 40.3 in FIGS. 13 and 14. In detail, FIG. 11 shows a bearing journal 44 which is inserted vertically into bores of the upper housing half 45 and of the enveloping wall 5, such that said bearing journal fixes the position of the enveloping wall 5 relative to the upper housing half 45 in a horizontal direction. At the same time, the enveloping wall 5 is supported elastically against the upper housing half 45 by means of a compression spring 43 mounted on the bearing journal 44.

FIG. 12 illustrates a bearing journal 44 in the form of a bolt which is screwed into the lower housing half 46 and which braces a flange of the enveloping wall 5 against the lower housing half 46 via a disk spring 42. The enveloping wall 5 is thus elastically fixed by means of the flange on the lower housing half 46 in a vertical direction, and can move in the vertical direction relative to the lower housing half 46 and relative to the upper housing half 45. It is thus possible, for example, for tilting of the flange as a result of thermal expansion in the parting joint of the transmission housing 13 to be permitted.

In FIG. 13, a bearing journal 44 that is guided vertically through the enveloping wall 5 and the lower housing half 46 bears two compression springs 43, such that the enveloping wall 5 can move in the horizontal direction relative to the lower housing half 46, but is fixed in a vertical direction counter to the force of the compression springs 43. It would alternatively also be possible for a movement capability in a vertical direction to be realized.

The embodiment of FIG. 14 is similar to that of FIG. 13, the only difference being that two bearing journals 44 are provided, of which in each case one bears a compression spring 43.

Figure 7:
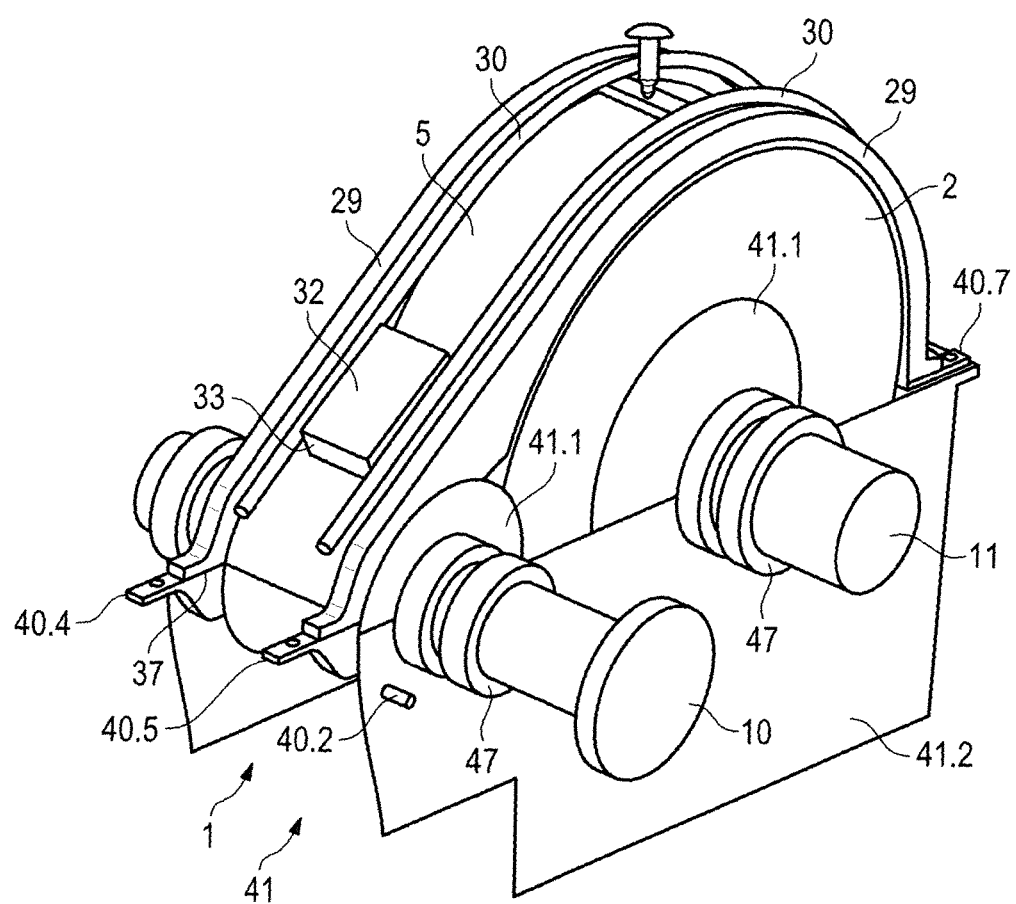
FIG. 7 shows the embodiment as per FIG. 6 but without a transmission housing.

FIG. 7 illustrates the embodiment of FIG. 6 once again without a transmission housing. It can be seen in particular that the maintenance opening 32 is provided above the engagement region of the toothings, in which the enveloping wall 5 has a concave contour to form the ring-shaped gaps. It can also be seen in FIG. 7 that the shield plates 41 in the exemplary embodiment shown also have a parting joint corresponding to the parting joint 37 of the enveloping wall 5. Furthermore, it is in particular the case that the shield plates 41 are made up of a shield plate upper part 41.1, more specifically in each case one shield plate upper part 41.1 per bearing 47, and one shield plate lower part 41.2 via the parting joint. In the exemplary embodiment shown, the shield plate lower part 41.2 is of angular, in particular polygonal, design, whereas the shield plate upper parts 41.1 have a circular or circular-sector-shaped contour.

Figure 8:
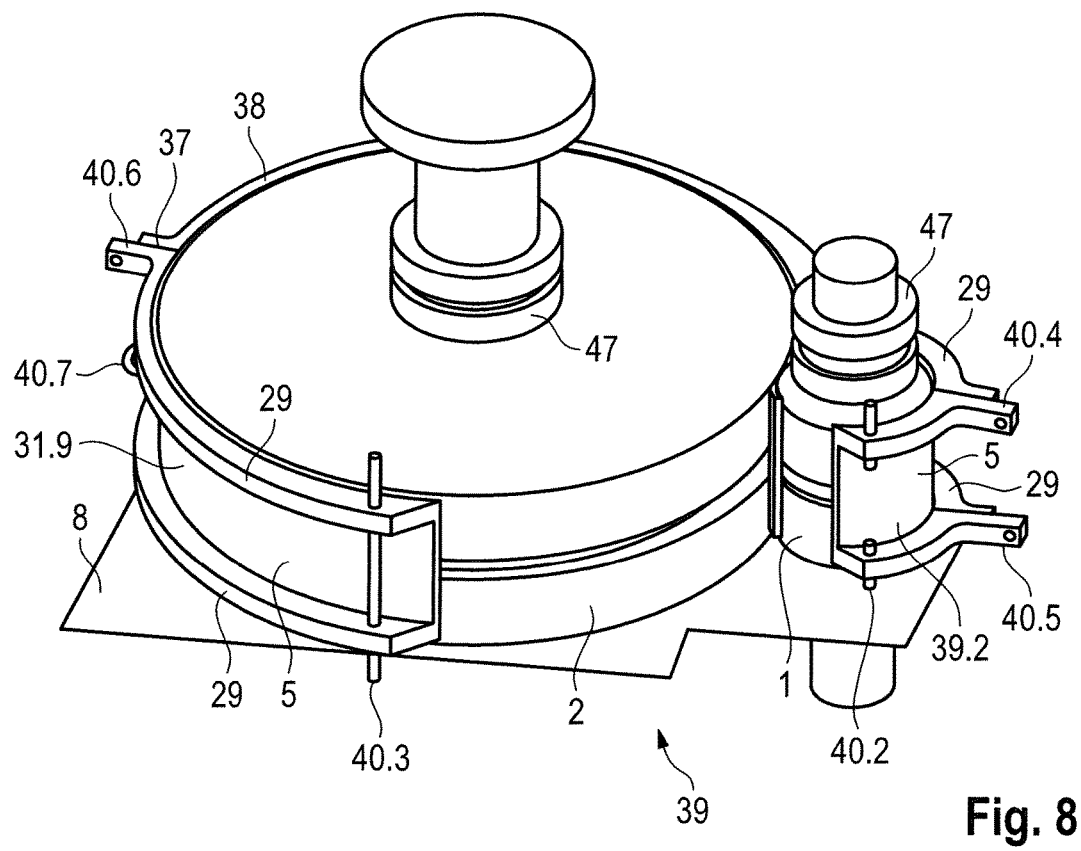
FIG. 8 shows a three-dimensional plan view obliquely downward onto the enveloping wall.

It can be clearly seen once again from FIG. 8 that the enveloping wall 5, which has the webs 29 also on its underside, does not fully enclose the spur gears 1, 2. At the same time, it can be seen that the pipes 30 illustrated in FIGS. 6 and 7 do not extend as far as the underside of the enveloping wall 5, but rather extend only in the upper region thereof. It can also be seen from FIG. 8 that the lower part 39 of the enveloping wall 5 is formed from two individual housing parts 39.1 and 39.2, whereas the upper part 38 in the exemplary embodiment shown is of unipartite form.

Figure 9:
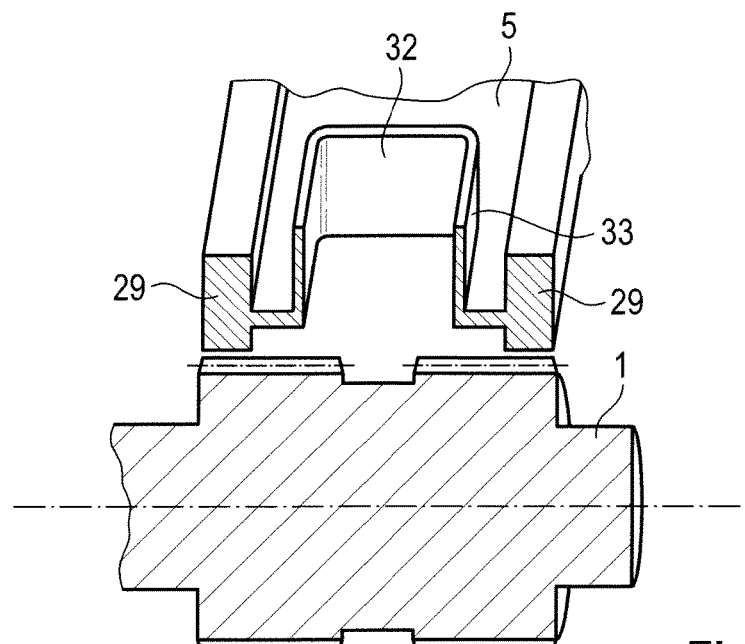
FIG. 9 shows a cross section through the enveloping wall in the region of a maintenance opening.

FIG. 9 shows once again the webs 29 and the side walls 33 of the maintenance opening 32. As can be seen, the webs 29 may advantageously also protrude radially inward from the enveloping wall 5.

Figure 10:
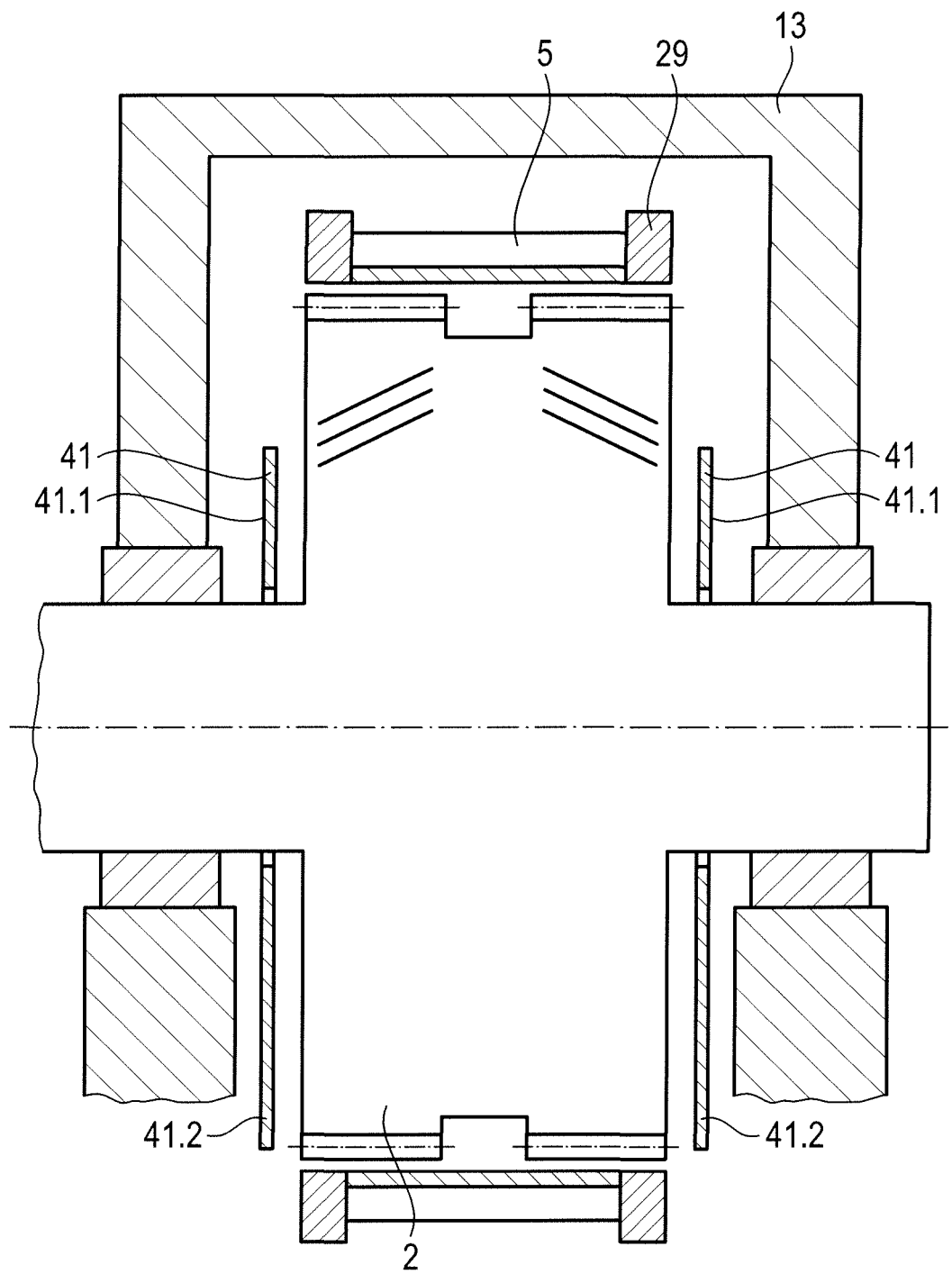
FIG. 10 shows a further cross section through the enveloping wall, the transmission housing and a spur gear.

FIG. 10 shows a corresponding but more comprehensive section in the region of the spur gear 2, but outside the maintenance opening. Furthermore, in this exemplary embodiment, the webs 29 protrude only radially outward from the enveloping wall 5. This could however also be different. In FIG. 10, the spacing of the shield plates 41 to the face side of, in this case, the second spur gear 2 can also be seen once again.

Whereas FIGS. 1 to 14 show embodiments according to the invention of a spur gear transmission with two spur gears 1, 2 in engagement with one another, it is self-evident that this type of partial encapsulation with cooling oil guidance may likewise be used for embodiments of spur gear transmissions with multiple spur gears. Such multi-shaft spur gear transmissions are, in a particularly advantageous application, designed as so-called multi-shaft transmissions, and are used in geared turbomachines or so-called geared compressors.

Examples of multi-shaft spur gear transmissions with at least three spur gears are depicted in simplified schematic form in FIGS. 15 to 17a and 18. An example of a geared turbomachine 57 is depicted in FIG. 17b. The transmission structures may be designed with the abovementioned embodiments of the enveloping wall 5. To avoid repetitions, the illustration and description of these will be omitted, and only the exemplary transmission structures will be described.

Figure 15:
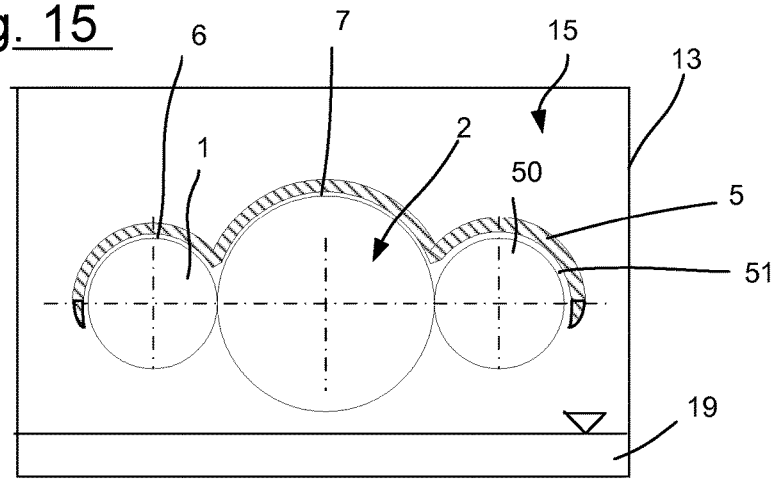
FIG. 15 shows a three-shaft design of a spur gear transmission.

By way of example, FIG. 15 shows an embodiment with a three-shaft spur gear transmission, wherein here, two spur gears in the form of pinions are in engagement with one large gear. The large gear is formed by the spur gear 2, whereas the spur gear 1 is formed by a pinion in engagement therewith. The further spur gear 50 that is in engagement with the large gear is likewise designed as a pinion. Here, the pinions may be driving or driven pinions, or both pinions are driven by means of the large gear. The ring-shaped gap formed between the outer circumference of the spur gear 50 and inner circumference of the enveloping wall 5 is denoted by 51. The individual spur gears are arranged with their axes of rotation in a plane. The mounting can therefore be realized in a planar parting joint of the transmission housing 13. The enveloping wall 5 encloses the individual spur gears 1, 2, 50 in each case around a partial region of their outer circumference in the circumferential direction, such that the pinions and also the large gear project out of the enveloping wall 5 downward, or in a manner pointing in the direction of the oil sump 19, as viewed in a vertical direction.

Figure 16:
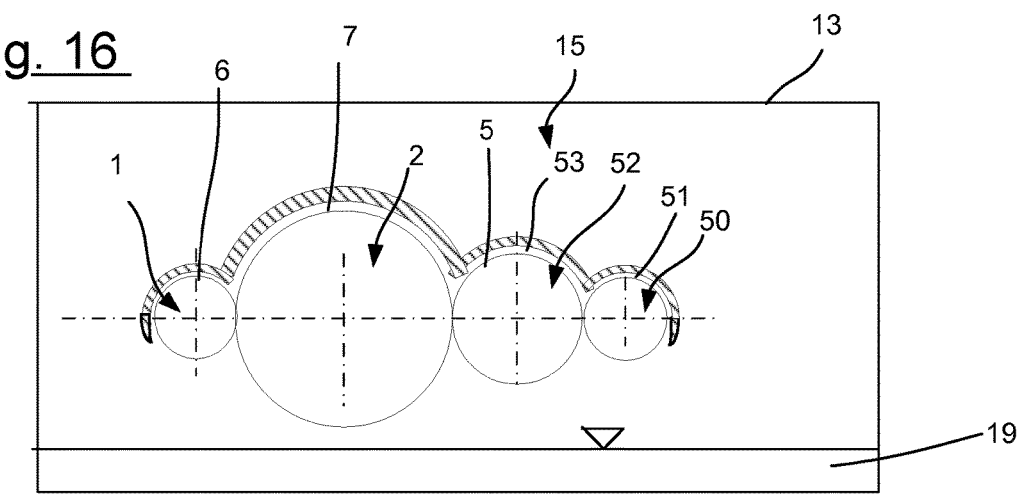
FIG. 16 shows, by way of example, a four-shaft design of a spur gear transmission.

FIG. 16 illustrates a refinement of an embodiment as per FIG. 15 with axes of rotation of the spur gears of a multi-shaft spur gear transmission arranged in a parting joint of the housing 13. In the illustrated case, between the spur gear 50 in the form of the pinion and the spur gear 2 formed as a large gear, there is provided a further spur gear 52 in the form of an intermediate gear. Said intermediate gear is preferably coupled to a driving shaft. The two pinions function as driven pinions. Other configurations are conceivable depending on the usage situation.

Figure 17A:
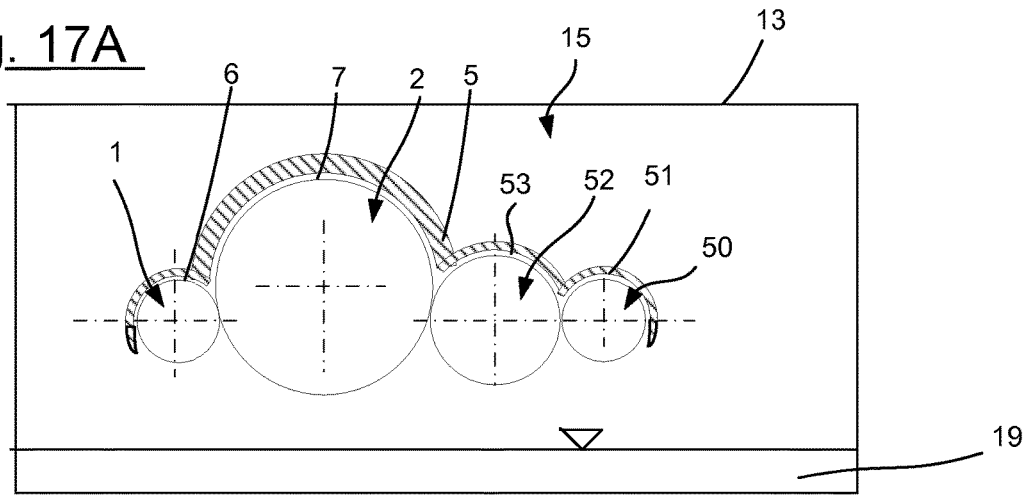
FIG. 17a shows a design as per FIG. 15 with a vertically offset spur gear.

FIG. 17a illustrates a refinement of an embodiment as per FIG. 16, wherein the large gear, as viewed in a vertical direction in an installed position, axis of rotation of the large gear arranged offset with respect to the parting joint for the mounting of the spur gears 1, 50, 52 (pinions and intermediate gear). FIG. 17b illustrates, for such a transmission embodiment, the use in a geared turbomachine 57. This, by means of the spur gear transmission, integrates driving and/or driven assemblies to form a machine train. Steam turbines, gas turbines, expanders and engines are possible individually or in combination as driving assemblies, and compressors and generators are possible individually or in combination as driven assemblies. The geared turbomachines are thus formed as a geared compressor or expander installation or a combination of both. In the illustrated case, compressors V1 to V4 coupled to each of the pinion shafts connected to the pinions are provided as driven assemblies, whereas a driving machine 54 drives these via the spur gear 52 in the form of an intermediate gear.

FIG. 18 illustrates, by way of example, a refinement of an embodiment as per FIG. 15, in which a further spur gear 55, which is offset in a vertical direction with respect to the other spur gears 1, 50 and 2 and which is in the form of a pinion, is in engagement with the spur gear 2. The axes of rotation of the individual spur gears are thus arranged in different planes. In this case, too, the enveloping wall 5 encloses the spur gear train, wherein the in each case outer spur gears as viewed in the axial direction in the installed position are enclosed by said enveloping wall in the circumferential direction such that a partial region of said spur gears projects out in the direction of the oil sump 19.

FIG. 19 illustrates, by way of example on the basis of an embodiment as per FIG. 15, an embodiment of the enveloping wall 5 with upper and lower parts 38, 39 which are arranged so as to form a gap 58 of small size, in particular in the mm range, relative to one another and which are mounted separately in the transmission housing 13. The upper and lower parts 38, 39 are positioned relative to one another by means of the mounting in the transmission housing 13.

LIST OF REFERENCE DESIGNATIONS

1 Spur gear
2 Spur gear
3 Axis of rotation
4 Axis of rotation
5 Enveloping wall
6 Ring-shaped gap
7 Ring-shaped gap
8 Side cover
9 Side cover
10 Shaft
11 Shaft
12 Opening
13 Transmission housing
14 Interior space
15 Engagement region of the toothings
16 Wedge
17 Wedge
18 Vacuum pump
19 Oil sump
20 Projecting part
21 First oil volume flow
22 First oil pump
23 Second oil volume flow
24 Second oil pump
25 Cooling ribs
26 Lubricating device
27 Cooling device
28 Cooling duct
29 Web
30 Pipe
31 Outlet opening
32 Maintenance opening
33 Side wall
37 Parting joint
38 Upper part
39 Lower part
39.1, 39.2 Individual housing parts
40.1, 40.2
40.3, 40.4
40.5, 40.6
40.7 Bearing point
41 Shield plate
41.1 Shield plate upper part
41.2 Shield plate lower part
42 Disk spring
43 Compression spring
44 Bearing journal
45 Upper housing half
46 Lower housing half
47 Bearing
50 Spur gear, in particular pinion
51 Ring-shaped gap
52 Spur gear, in particular intermediate gear
53 Ring-shaped gap
54 Driving machine
55 Spur gear, in particular pinion
56 Ring-shaped gap
57 Geared turbomachine

The invention claimed is:

1. A spur gear transmission, comprising:
at least two toothed spur gears rotatably disposed about a respective axis of rotation and having toothings in meshing engagement with one another, each said spur gear having a given outer diameter;
an enveloping wall at least partially enclosing said two spur gears in a circumferential direction and in a direction of the axis of rotation;
said enveloping wall having an inner contour adapted to the given outer diameters of said spur gears, forming two ring-shaped gaps between said enveloping wall and said spur gears that merge into one another, with each said ring-shaped gap being arranged at least substantially concentrically with respect to a respective said axis of rotation; and
wherein said enveloping wall is a multi-part housing formed with upper and lower housing parts that are spaced apart from one another, so as to form a gap, along a parting joint, and to be free from a connection to one another, and said upper and lower housing parts are separately mounted to a transmission housing that accommodates the spur gear transmission, so as to form said enveloping wall, and the parting joint extends partially or entirely within a plane in which one said axis of rotation or said axes of rotation of said spur gears run.

2. The spur gear transmission according to claim 1, wherein said upper part of said housing encloses at least one half of a common outer circumference of said at least two spur gears in unipartite fashion.

3. The spur gear transmission according to claim 1, wherein said enveloping wall is elastically mounted in one or both of a vertical direction or horizontal direction.

4. The spur gear transmission according to claim 1, which comprises a transmission housing with an interior space that is filled with an air-lubricant mixture, wherein said spur gears together with said enveloping wall are disposed in said interior space.

5. The spur gear transmission according to claim 4, wherein said enveloping wall is mounted in said transmission housing by way of individual, locally delimited bearing points, and wherein at least two said bearing points are provided at said parting joint or below said parting joint of said enveloping wall.

6. The spur gear transmission according to claim 5, wherein at least one upper bearing point is formed at an upper end of said enveloping wall.

7. The spur gear transmission according to claim 6, wherein each said bearing point is elastically supported in said transmission housing.

8. The spur gear transmission according to claim 6, wherein said upper bearing point is supported elastically in a vertical direction and non-elastically in a horizontal direction in said transmission housing, and said lower bearing points are supported elastically in the horizontal direction and non-elastically in the vertical direction in said transmission housing.

9. The spur gear transmission according to claim 1, wherein each said spur gear has at least one shaft being a driving shaft or a driven shaft, and each said shaft is mounted in said transmission housing without a bearing in said enveloping wall.

10. The spur gear transmission according to claim 1, wherein each spur gear has at least one shaft being a driving shaft or a driven shaft, and each said shaft has at least one bearing, and which comprises shield plates between said bearings and face sides of said spur gears and disposed at a spacing distance from the face sides.

11. The spur gear transmission according to claim 1, wherein said enveloping wall is produced from rolled and bent sheet metal.

12. The spur gear transmission according to claim 11, wherein said rolled or bent sheet metal is formed without mechanical reworking of a rolled sheet metal surface forming the internal contour.

13. The spur gear transmission according to claim 1, wherein said enveloping wall has a thermal conductivity that is higher than a thermal conductivity of said transmission housing.

14. The spur gear transmission according to claim 1, wherein said enveloping wall is produced from aluminum or an aluminum alloy, and said transmission housing is produced from steel or a steel alloy.

15. The spur gear transmission according to claim 1, wherein said at least two spur gears are a multiplicity of spur gears each rotatably disposed about an axis of rotation, wherein each of said spur gears is in meshing engagement with at least one other said spur gear, and said enveloping wall extends around at least a partial region of each of said spur gears, and said axis of rotation of one of said spur gears or of all of said spur gears are arranged in a plane at a common parting joint of said transmission housing.

16. A geared turbomachine, comprising:
a plurality of driving and/or driven assemblies;
a spur gear transmission according to claim 1 having individual shafts connected to said spur gears and integrating said assemblies to form a machine train by connection to the individual said shafts.

17. The geared turbomachine according to claim 16, wherein said driving and/or driven assembly connected to said shafts is an element selected from the group consisting of an impeller of a compressor stage and an impeller of an expander stage.

18. A method for assembling a spur gear transmission, the method comprising the following steps:
providing parts of a transmission housing having a lower housing half and an upper housing half, shield plates having lower halves and upper halves, and an enveloping wall forming a housing with a lower part and an upper part;
installing lower halves of the shield plates in a lower housing half of the transmission housing and, either simultaneously therewith or subsequently, installing upper halves of the shield plates in an upper housing half of the transmission housing;
following the installation of the lower halves of the shield plates into the lower housing half of the transmission housing, installing a lower part of the housing of the enveloping wall in the lower housing half of the transmission housing;
installing the spur gears together with bearings of the spur gears;
subsequently installing an upper part of the housing of the enveloping wall to thereby completely assemble the enveloping wall; and
subsequently installing the upper housing half of the transmission housing; to thereby assemble the spur gear transmission of claim 1.

19. A spur gear transmission, comprising:
at least two toothed spur gears rotatably disposed about a respective axis of rotation and having toothings in meshing engagement with one another, each said spur gear having a given outer diameter;
an enveloping wall at least partially enclosing said two spur gears in a circumferential direction and in a direction of the axis of rotation;
said enveloping wall having an inner contour adapted to the given outer diameters of said spur gears, forming two ring-shaped gaps between said enveloping wall and said spur gears that merge into one another, with each said ring-shaped gap being arranged at least substantially concentrically with respect to a respective said axis of rotation; and
wherein:
said enveloping wall is a multi-part housing that is closed along a parting joint that extends partially or entirely within a plane in which one said axis of rotation or two axes of rotation of said toothed spur gears run;
said housing includes an upper part and a lower part that are detachably joined to one another along the parting joint, and said lower part has a plurality of individual housing parts jointly forming said lower part and being detachably attached to said upper part;
a transmission housing having an interior space to be filled with an air-lubricant mixture and enclosing said spur gears together with said enveloping wall in said interior space;
wherein said enveloping wall is mounted in said transmission housing by way of individual, locally delimited bearing points, and wherein at least two said bearing points are provided at said parting joint or below said parting joint of said enveloping wall.

20. A method for assembling a spur gear transmission, the method comprising the following steps:
providing parts of a transmission housing having a lower housing half and an upper housing half, shield plates having lower halves and upper halves, and an enveloping wall forming a housing with a lower part and an upper part;
installing lower halves of the shield plates in a lower housing half of the transmission housing and, either simultaneously therewith or subsequently, installing upper halves of the shield plates in an upper housing half of the transmission housing;
following the installation of the lower halves of the shield plates into the lower housing half of the transmission housing, installing a lower part of the housing of the enveloping wall in the lower housing half of the transmission housing;
installing the spur gears together with bearings of the spur gears;
subsequently installing an upper part of the housing of the enveloping wall to thereby completely assemble the enveloping wall; and subsequently installing the upper housing half of the transmission housing; to thereby assemble the spur gear transmission of claim 19.

21. The spur gear transmission according to claim 19, wherein said upper part of said housing encloses at least one half of a common outer circumference of said at least two spur gears in unipartite fashion.

22. The spur gear transmission according to claim 19, wherein said enveloping wall is elastically mounted in one or both of a vertical direction or horizontal direction.

23. The spur gear transmission according to claim 19, wherein at least one upper bearing point is formed at an upper end of said enveloping wall.

24. The spur gear transmission according to claim 23, wherein each said bearing point is elastically supported in said transmission housing.

25. The spur gear transmission according to claim 23, wherein said upper bearing point is supported elastically in a vertical direction and non-elastically in a horizontal direction in said transmission housing, and said lower bearing points are supported elastically in the horizontal direction and non-elastically in the vertical direction in said transmission housing.

26. The spur gear transmission according to claim 19, wherein each said spur gear has at least one shaft being a driving shaft or a driven shaft, and each said shaft is mounted in said transmission housing without a bearing in said enveloping wall.

27. The spur gear transmission according to claim 19, wherein each spur gear has at least one shaft being a driving shaft or a driven shaft, and each said shaft has at least one bearing, and which comprises shield plates between said bearings and face sides of said spur gears and disposed at a spacing distance from the face sides.

28. The spur gear transmission according to claim 19, wherein said enveloping wall is produced from rolled and bent sheet metal.

29. The spur gear transmission according to claim 28, wherein said rolled or bent sheet metal is formed without mechanical reworking of a rolled sheet metal surface forming the internal contour.

30. The spur gear transmission according to claim 19, wherein said enveloping wall has a thermal conductivity that is higher than a thermal conductivity of said transmission housing.

31. The spur gear transmission according to claim 19, wherein said enveloping wall is produced from aluminum or an aluminum alloy, and said transmission housing is produced from steel or a steel alloy.

32. The spur gear transmission according to claim 19, wherein said at least two spur gears are a multiplicity of spur gears each rotatably disposed about an axis of rotation, wherein each of said spur gears is in meshing engagement with at least one other said spur gear, and said enveloping wall extends around at least a partial region of each of said spur gears, and said axis of rotation of one of said spur gears or of all of said spur gears are arranged in a plane at a common parting joint of said transmission housing.

* * * * *